(12) United States Patent
Ohba

(10) Patent No.: US 7,006,414 B2
(45) Date of Patent: Feb. 28, 2006

(54) OPTICAL DISK DEVICE

(75) Inventor: Setsuo Ohba, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 735 days.

(21) Appl. No.: 10/022,723

(22) Filed: Dec. 20, 2001

(65) Prior Publication Data

US 2002/0089910 A1    Jul. 11, 2002

(30) Foreign Application Priority Data

Dec. 25, 2000  (JP) ............................ 2000-392356
Apr. 20, 2001  (JP) ............................ 2001-122611

(51) Int. Cl.
G11B 7/125    (2006.01)

(52) U.S. Cl. .............................. 369/47.53; 369/47.52; 369/13.26; 369/53.27; 369/59.11; 369/116

(58) Field of Classification Search ............ 369/47.53, 369/47.43, 47.37, 59.12, 59.11, 53.27, 116, 369/47.52, 13.26
See application file for complete search history.

(56) References Cited

U.S. PATENT DOCUMENTS

| | | | |
|---|---|---|---|
| 6,320,832 B1 * | 11/2001 | Nakao et al. ............ | 369/47.53 |
| 6,487,152 B1 * | 11/2002 | Nakamura ............... | 369/47.53 |
| 6,504,806 B1 * | 1/2003 | Nakajo ................... | 369/59.12 |
| 6,556,524 B1 * | 4/2003 | Takeshita ................ | 369/47.43 |
| 6,577,570 B1 * | 6/2003 | Lee et al. ............... | 369/47.53 |
| 6,628,595 B1 * | 9/2003 | Sasa et al. .............. | 369/59.12 |
| 6,704,269 B1 * | 3/2004 | Ogawa .................... | 369/116 |

FOREIGN PATENT DOCUMENTS

| | | |
|---|---|---|
| JP | 3-29126 | 2/1991 |
| JP | 11-185513 | 7/1999 |

* cited by examiner

Primary Examiner—William Korzuch
Assistant Examiner—Kim-Kwok Chu
(74) Attorney, Agent, or Firm—Dickstein Shapiro Morin & Oshinsky LLP (57) ABSTRACT

An optical disk device for writing information on an optical disk having an APC part for monitored driving of a laser diode is provided which performs first and second OPCs. An unused partition of a test area and reference power value are read out from the optical disk. APC is turned off if the recording speed exceeds 1×. A first optimum writing power value is obtained by writing on the unused partition by driving the laser diode at a plurality of first test laser power values centered on the reference power value and reading out the information. APC is turned on if the recording speed exceeds 1×. A second optimum writing power value is obtained by writing on a subsequent unused partition by driving the laser diode at a plurality of second test laser power values centered on the first optimum writing power value and reading out the information.

9 Claims, 6 Drawing Sheets

OPTICAL DISK DEVICE

BACKGROUND OF THE INVENTION

1. Field of the Invention

The present invention generally relates to an optical disk device and particularly relates to an optical disk device for reading and writing information on an optical disk.

2. Description of the Related Art

CD-R (CD-recordable) is an optical disk of a write-once read-many type. A laser beam is irradiated on the optical disk to write information on such a recordable type optical disk. Before writing information on the optical disk, a test is carried out to derive an optimum laser power (OPC: Optimum Power Control) to improve reading accuracy of the written information. The CD-R is provided with a test area divided into 100 partitions to allow 100 times of such tests.

Figure 7:
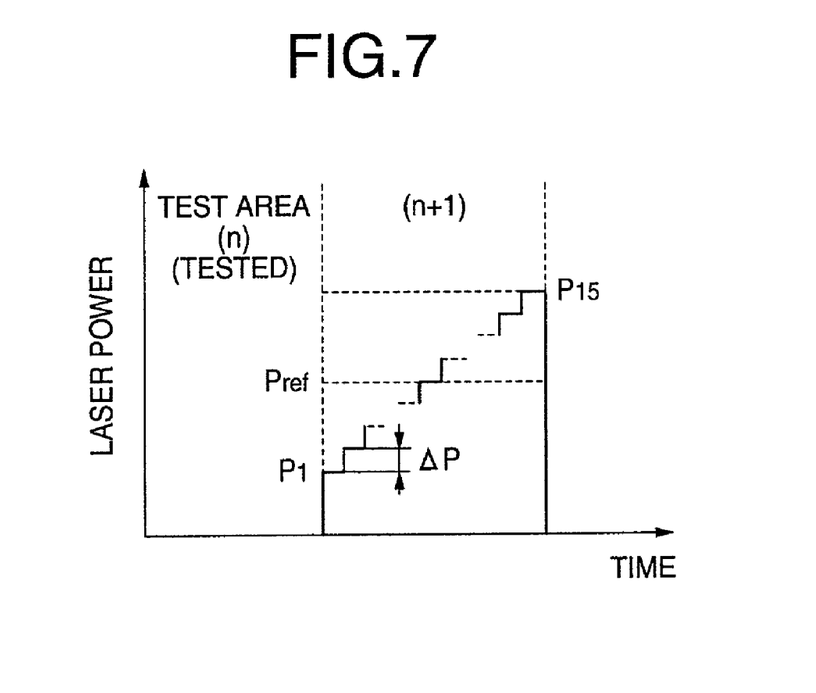
FIG. 7 is a graph of laser power against time of the prior art used for explaining how a writing operation is carried out on a test area.

FIG. 7 shows a graph of laser power against time illustrating how a test is carried out for partition (n+1) which is a partition following the already tested partition (n). A reference power value ($P_{ref}$) prerecorded on the optical disk is read out. Then, centering on the reference power value ($P_{ref}$), 15 steps of power are determined between 0.7 $P_{ref}$ and 1.3 $P_{ref}$ at equal intervals ($\Delta P$). Test information is recorded on partition (n+1) using the 15 steps of power values. The recorded test information for each power value is read out and the power value indicating the optimum power of the laser diode is determined. Actual information is written on the optical disk using the thus obtained optimum power of the laser diode.

Also, when writing information on the CD-R, the laser diode power is monitored by a photodiode provided adjacent the laser diode so as to control the current supplied to the laser diode such that the laser diode power takes a predetermined value (APC: Automatic Power Control).

Generally, the APC of the optical disk device is operated by driving the laser diode such that a laser beam is not focused on the optical disk at the start of a writing operation. Thus, the amount of current to be supplied, or the quantum efficiency (=light emission power/driving current), is derived. The laser beam is not focused on the optical disk to prevent unwanted information from being written on the optical disk.

If, after having achieved the focus state, the laser diode is still driven with the same electric current as the current obtained in the APC during the non-focused state, the writing power becomes higher than the light emitting power in a non-focused state.

In other words, when a focus servo control is applied to achieve a state where there is a reflected light towards the laser diode, there arises an offset between a setting power and an actual light emitting power.

Thus, according to the invention of Japanese laid-open patent application No. 3-29125, a writing operation is started at a driving current slightly lower than the driving current derived when there is no reflected light, so as to reduce the difference between the setting power and the actual light emitting power. Further, after initiating the writing operation, the actual light emitting power is controlled such that it becomes the same as the setting power.

However, for CD-R, the OPC is carried out with the writing time for each recording level being only 1/75 second at a normal speed (1×). For high-speed recording, the writing time will be further reduced by a factor of the speed. Accordingly, even if-OPC is carried out, there is not enough time to achieve a state where the light emitting power is equal to the setting power, and thus the APC cannot be implemented.

Japanese laid-open patent application No. 11-185513 proposes a method of implementing a constant current drive which aims to obviate such a problem. An APC is operated using a part of the test area to derive the quantum efficiency in a focuses state in advance. Then, using the derived quantum efficiency, the light emitting power of the laser diode during an OPC is made equal to the setting power at an instant the APC is turned off.

Figure 8A:
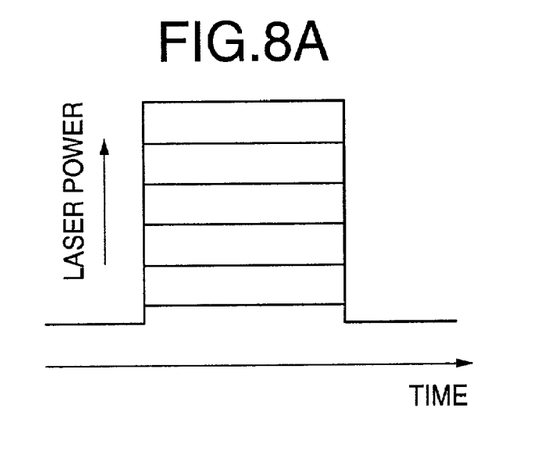
FIGS. 8A to 8C are graphs of laser power against reflected light.
Figure 8B:
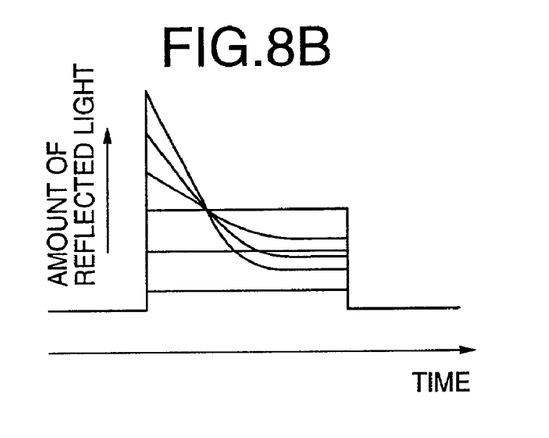

When a writing operation is carried out on the optical disk while keeping the power of the laser diode constant, as shown in FIG. 8A, the quantity of the reflected light from the optical disk varies as shown in FIG. 8B.

That is to say, within a range where the recording layer of the optical disk does not fuse, the amount of the reflected light increases in proportion to the laser power.

However, within a range where the recording layer fuses and the information is written on the optical disk, the amount of reflected light decreases as the laser power increases. In other words, as the recording layer starts fusing and the fused area increase, the amount of reflected light decreases until it reaches the amount of reflected light corresponding to the fused area corresponding to the power of the irradiating laser beam.

Figure 8C:
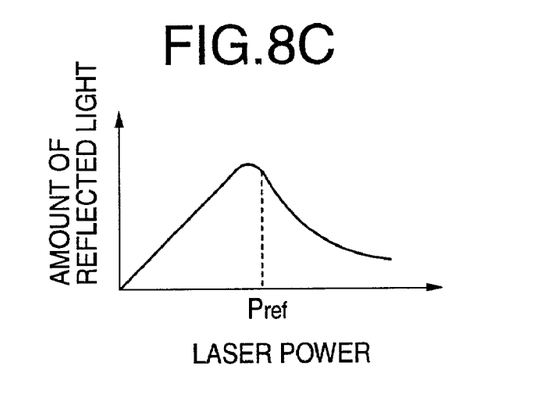

That is to say, as shown in FIG. 8C, the amount of reflected light against the laser power drastically changes near the optimum recording power since the recording layer starts to fuse. This is shown as a point of inflection in FIG. 8C.

In the invention described in the above-mentioned Japanese laid-open patent application No. 11-185513 also, the amount of reflected light drastically changes for a slight change of the writing power in the region near the optimum recording power. Therefore, even if the quantum efficiency in a focused state is derived in advance and the OPC is carried out at a constant current drive with the APC being turned off, there arises a slight difference between an optimum recording power obtained when a test writing is implemented at a constant current drive and an optimum recording power obtained when a test writing is implemented with the APC being turned on.

Recently, due to a higher recording speed, the margin of the optimum power during a high-speed recording of the optical disk, i.e., the range of power in which an optimum recording is possible, has become narrow. Thus, such a slight difference may cause a serious problem.

SUMMARY OF THE INVENTION

Accordingly, it is a general object of the invention to provide an optical disk device which can solve the problems described above.

It is another and more specific object of the present invention to provide an optical disk device in which information can be recorded accurately during a high-speed recording.

According to the present invention, an optical disk device for writing information on an optical disk is provided which has an APC (Automatic Power Control) part for monitored driving of a laser diode and the optical disk device including:

preparation means for searching an unused partition of a test area of the optical disk and reading out a reference power value from the optical disk;

APC-turn off means for turning off the APC part when it is determined that the recording speed exceeds a predetermined speed;

first OPC (Optimum Power Control) means for obtaining a first optimum writing power value by writing on the unused partition by driving the laser diode at a plurality of first test laser power values centered on the reference power value, reading out the information recorded on the unused partition and determining the first optimum writing power value;

APC-turn on means for turning on the APC part when it is determined that the recording speed exceeds a predetermined speed; and second OPC (Optimum Power Control) means for obtaining a second optimum writing power value by writing on a subsequent unused partition by driving the laser diode at a plurality of second test laser power values centered on the first optimum writing power value, reading out the information recorded on the subsequent unused partition and determining the second optimum writing power value.

According to the optical disk device described above, information can be recorded on an optical disk with an improved accuracy and thus with reduced errors while reproducing the information.

DETAILED DESCRIPTION OF THE PREFERRED EMBODIMENTS

In the following, principles and embodiments of the present invention will be described with reference to the accompanying drawings.

Figure 1:
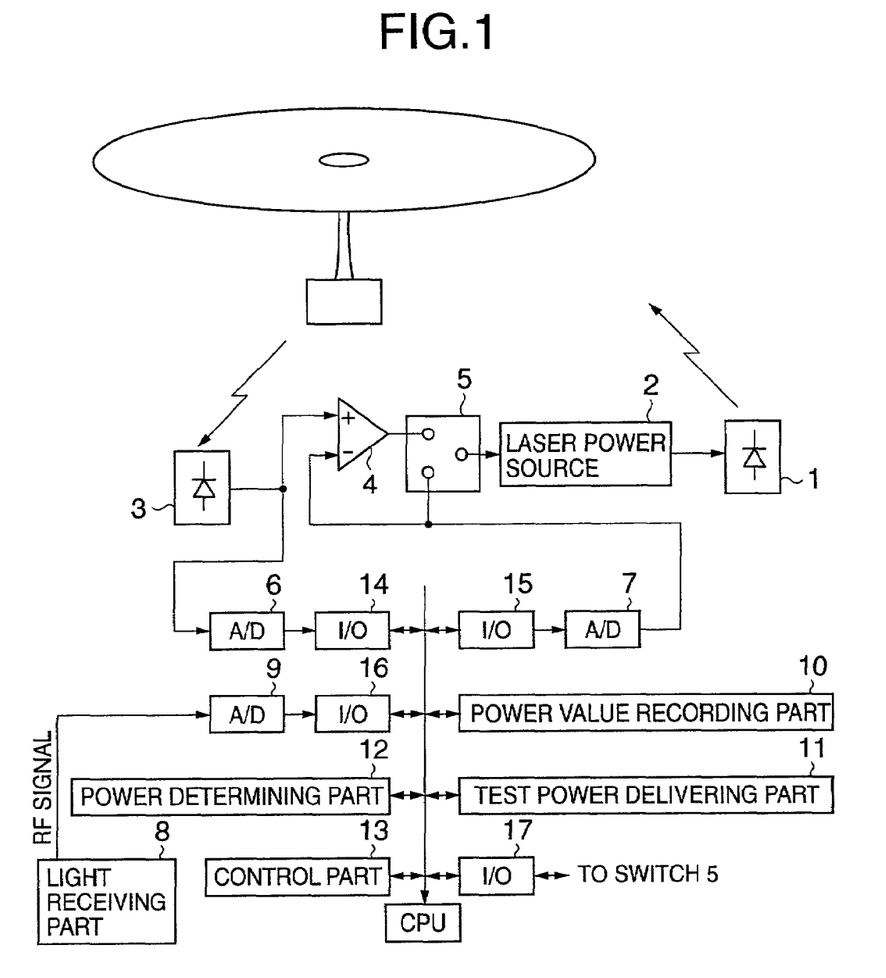
FIG. 1 is a block diagram showing an embodiment of the present invention.
Figure 2:
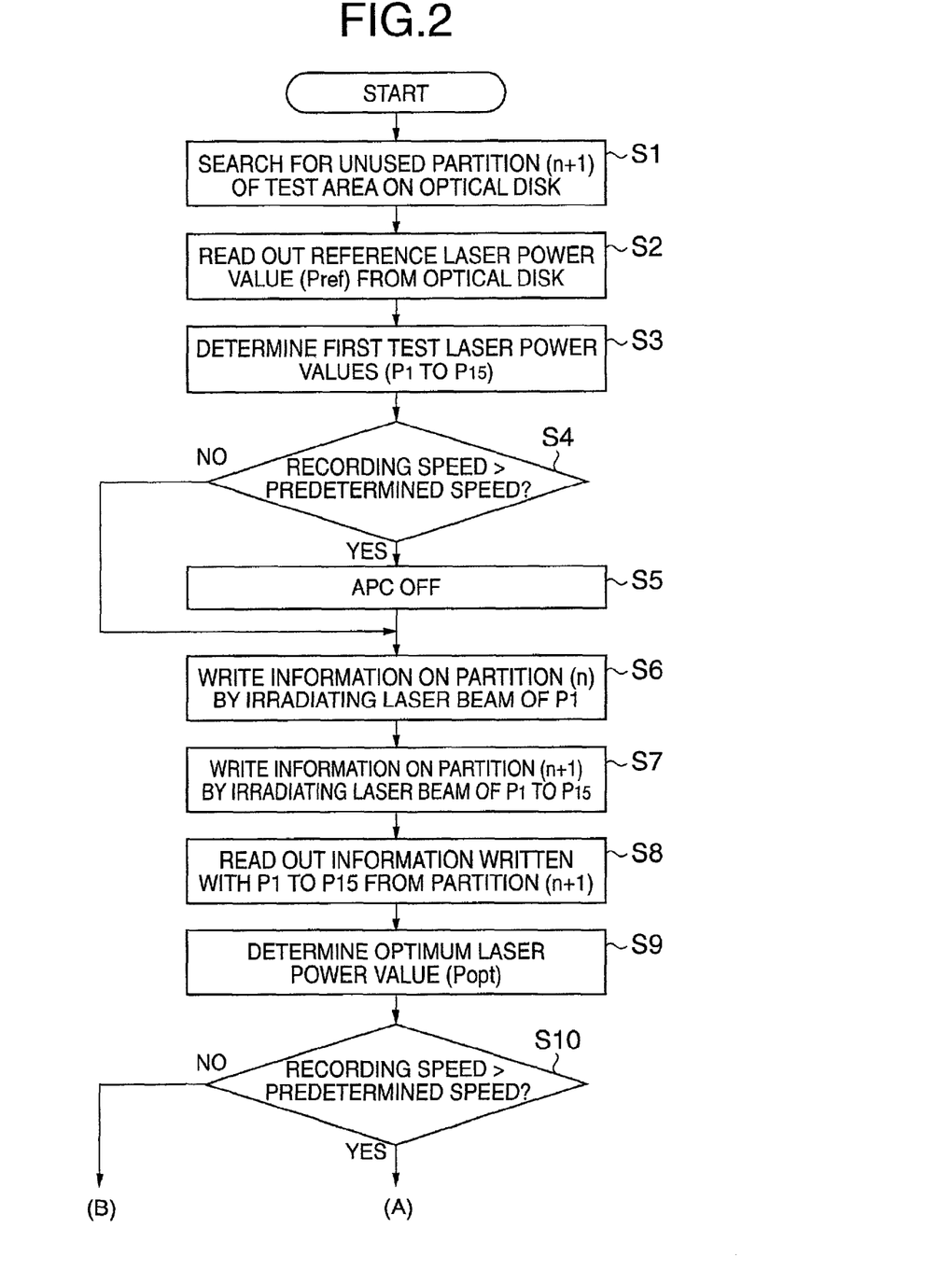
FIG. 2 is a first half of an operational flowchart of the embodiment shown in FIG. 1.
Figure 3:
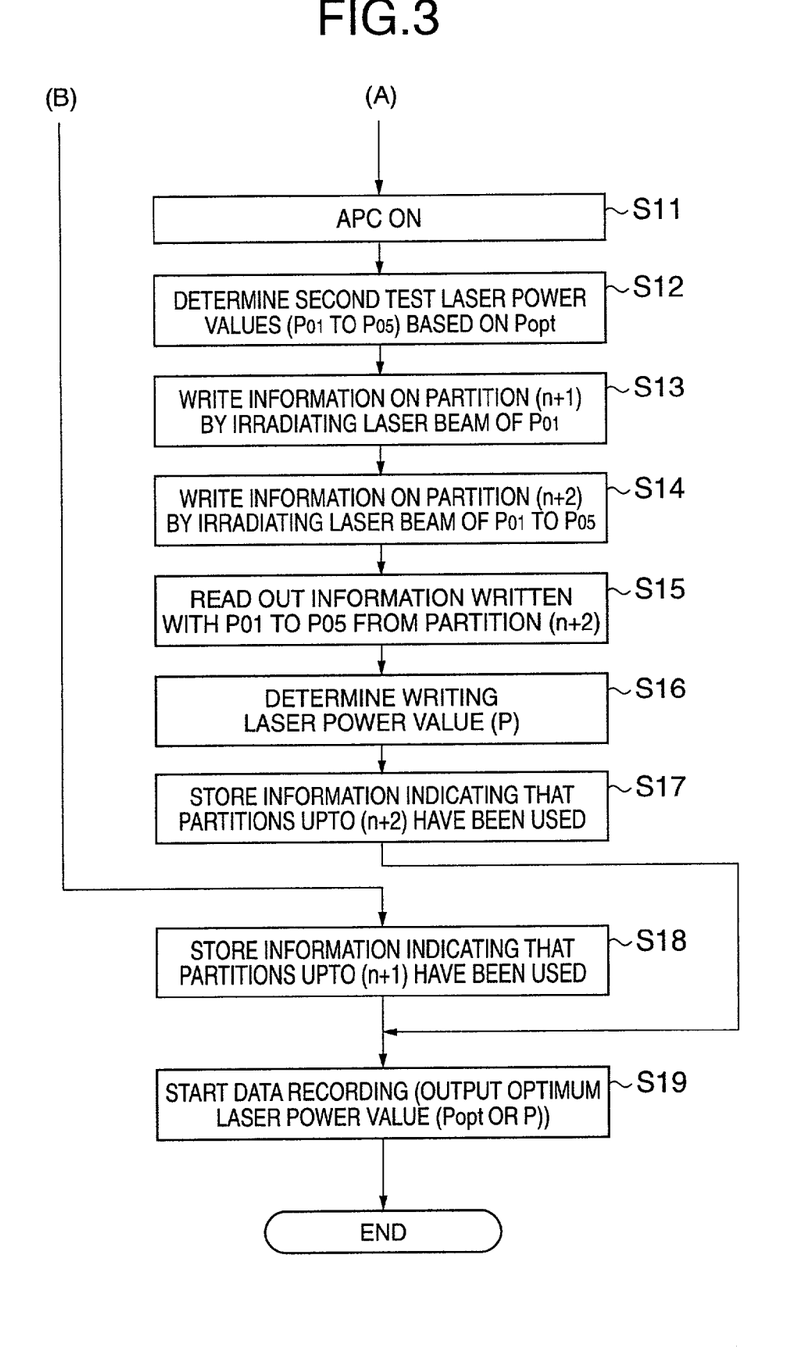
FIG. 3 is a second half of an operational flowchart of the embodiment shown in FIG. 1.

Referring now to FIGS. 1 to 3, an embodiment of the present invention will be described. FIG. 1 is a schematic diagram showing an optical disk device of an embodiment of the present invention and FIGS. 2 and 3 show the first half and the second half, respectively, of a flowchart of an operation of the embodiment of the present invention shown in FIG. 1.

Elements shown in FIG. 1 are a laser diode 1, a laser power source 2 for driving the laser diode 1, a photodiode 3 provided adjacent the laser diode 1 for monitoring the output of the laser diode 1, an error amplifier 4, a switch 5, analog/digital converters (A/D) 6 and 9, digital/analog converter (D/A) 7, a light-receiving part 8 for reading information recorded on the optical disk, a power value recording part 10, a test power delivering part 11, a power determining part 12, a control part 13, interfaces (I/O) 14 to 17 and a processor (CPU) 18.

When the switch 5 is connected to the error amplifier 4 (APC-on), the laser power supply 2 supplies a driving current to the laser diode 1 such that an output from the photodiode 3 and a value output via the I/O 15 and converted by the D/A 6 to an analog value becomes equal. Thus the laser diode emits light.

When the switch 5 is connected to the D/A 7 (APC-off), the laser power source 2 supplies a driving current corresponding to the output value from the D/A 7 to the laser diode 1. Thus the laser diode emits light.

Referring now to FIGS. 2 and 3, an operation of the embodiment will be described. The operation starts when recording information on the optical disk. It is to be noted that an explanation will be omitted for a case where the device is switched on for the same optical device and the recording operation has been carried out.

In step S1, the control part 13 searches for an unused partition (n+1) of a test area of the loaded optical disk. In step S2, reference power value $P_{ref}$ used for emitting light from the laser diode 1 during writing is read out from the loaded optical disk.

In step S3, the test power delivering part 11 derives laser power values $P_1$ to $P_{15}$ centered on the reference power value $P_{ref}$ readout in step S2.

The laser power values $P_1$ to $P_{15}$ are defined in the Orange Book which is a specification of CD-R. The calculations are as follows:

$$P_8 = \{1 + 0.4(K-1)\} P_{ref} \quad (1)$$

where K: factor of writing speed (e.g., K=2 for double speed)

$$P_1 = 0.7 P_8 \quad (2)$$

$$P_{15} = 1.3 P_8 \quad (3)$$

$P_2$ to $P_7$ and $P_9$ to $P_{14}$ are calculated by an equation:

$$P_n = P_1 + \Delta P \quad (4)$$

where $$P_n = (P_8 - P_1)/7 \quad (5)$$

In step S4, the control part determines whether the recording speed exceeds a predetermined speed, which may be the normal speed (1×). The predetermined speed is such a speed that when the recording power is altered, the recording time becomes shorter than the time required for controlling the recording power. If the result is YES, in other words, in case of high-speed recording, the process proceeds to step S5 where the switch 5 is switched to the D/A 7 side via the I/O 17 so as to turn off an APC drive for the laser diode 1.

In the present embodiment, step S4 is carried out for determining whether the recording speed exceeds the predetermined speed. However, the recording speed to be determined may be a speed higher than the predetermined speed, as long as it does not cause any problem.

In step S6, the control part 13 positions the optical head having the laser diode 1 and the photodiode 3 at the most recently used partition (n) of the test area of the optical disk and initiates writing at a laser beam power $P_1$ which is derived in step S3.

Figure 4:
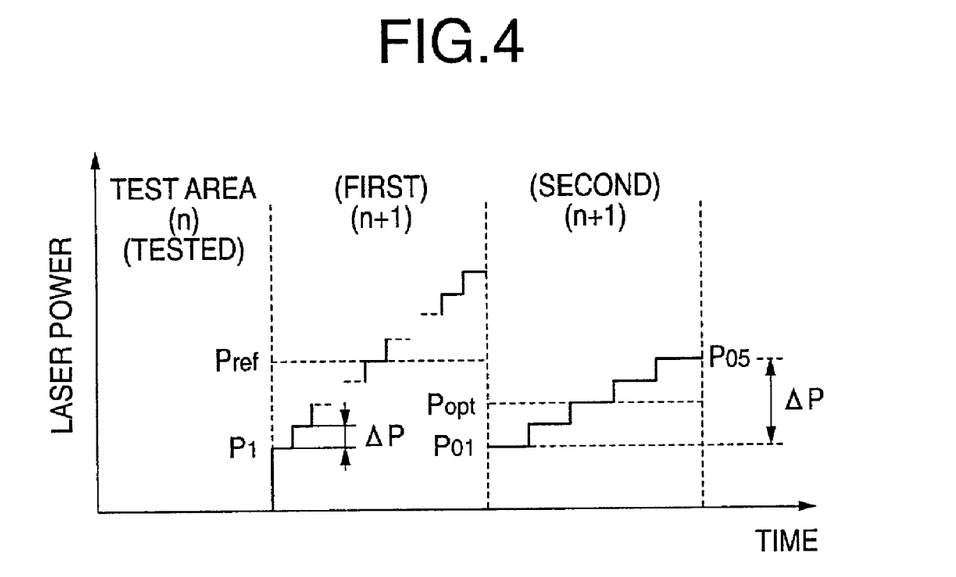
FIG. 4 is a graph of laser power against time of the embodiment shown in FIG. 1 used for explaining how a writing operation is carried out on a test area.

In step S7, when the optical disk rotates to a position where the optical head is at the unused partition (n+1) of the test area of the optical disk, the test power delivering part 11 sequentially outputs test laser power values $P_1$ to $P_{15}$ derived in step S3 to the error amplifier 4 via the I/O 15 in order to write information on the optical disk. In other words, a first writing operation shown in FIG. 4 is implemented.

It is to be noted that the reason for writing on the used partition (n) using the power value $P_1$ in step 6 is to derive the electric current efficiency of the laser diode under a focus controlled state for this partition in an APC state in order to prepare for constant current driving. The power used for writing may be of a value other than $P_1$.

In step S8, the power determining part 12 submits an instruction to obtain RF signals via the I/O 16 from the partition (n+1) of the test area written in step S7. Then the process proceeds to step S9 where the power determining part 12 derives the optimum laser power value $P_{opt}$.

The optimum laser power value $P_{opt}$ is derived as follows. A characteristic value $\beta$ is derived for each of the power values $P_1$ to $P_{15}$ for the first test (partition n+1) in FIG. 4, using an equation:

$$\beta=(P-B)/(P+B) \quad (6)$$

where P and B are a peak value and a bottom value, respectively, of an envelope of the RF signal readout from the optical disk. Then, the optimum laser power value $P_{out}$ resulting in $\beta=0.04$ is derived by proportional distribution and recorded in the power value recording part 10.

In step S10, the control part 13 determines whether the recording speed to the optical disk is at a predetermined speed (if the predetermined speed is the normal speed 1×, whether K=1 in equation (1)). If the result of the determination is YES, the process proceeds to step S18 for recording data in the optical disk indicating that the partitions up to (n+1) of the test area have already been used. Then, the process proceeds to step S19 where the optimum laser power value $P_{opt}$ recorded in the power value recording part 10 is read out and output to the error amplifier via the I/O 15. Thus the recording operation of the information is initiated.

Note that if it is determined in step S10 that the recording speed is at a predetermined speed, which may be normal speed (e.g., 1×), the process proceeds to step S18 and the recording of the information is carried out at the optimum laser power value $P_{opt}$ in step S19. This is because when the recording speed is 1×, i.e., when the rotational speed of the optical disk is low, the test writing on the optical disk is implemented accurately. In other words, it is not problematic even if information is recorded using the optimum laser power value $P_{opt}$ as in the prior art.

In the present invention, step S10 is carried out for determining whether the recording speed is at the predetermined speed. However, the recording speed to be determined may be a speed higher than the predetermined speed, as long as it does not cause any problem.

If the result of step S10 is NO, the process proceeds to step S11 where the switch 5 is switched to the error amplifier 4 side via the I/O 17 so as to turn off an APC drive for the laser diode 1.

In step S12, the test power delivering part 11 derives the second test laser power values $P_{01}$ to $P_{05}$ from $P_{opt}$ derived in step S9.

The second test laser power values $P_{01}$ to $P_{05}$ are calculated centered on $P_{opt}$ and using range $\Delta P$ shown in equation (5). The values $P_{01}$ to $P_{05}$ are 5 step values calculated by the following equations:

$$P_{03}=P_{opt}$$

$$P_{01}=P_{03}-0.5\Delta P$$

$$P_{02}=P_{03}-0.25\Delta P$$

$$P_{04}=P_{03}+0.25\Delta P$$

$$P_{05}=P_{03}+0.5\Delta P \quad (7)$$

The number of second test laser power values are not limited to 5 steps, but can be any number less than the number of laser power values of the first test, which is 15 steps in the present embodiment. Also, the range of the second test laser power value is $\Delta P$, but may be any range smaller than the range of the 15 steps of test laser power value of the first test.

In step S13, as has been described with reference to step S6, the control part 13 positions the optical head to the partition (n+1) and initiates the writing operation with a laser power value $P_{01}$.

In step S14, when the optical disk rotates to a position where the optical head is at the unused partition (n+2) of the test area of the optical disk, the test power delivering part 11 sequentially outputs test laser power values $P_{01}$ to $P_{05}$ calculated in step S12 to the error amplifier 4 via the I/O 15 in order to write information on the optical disk. In other words, a second writing operation shown in FIG. 4 is implemented.

In step S15, the power determining part 12 obtains RF signals via the I/O 16 from the partition (n+2) as has been described with reference to step S8. Then, the process proceeds to step S16 where the power determining part 12 derives the writing laser power value P as has been described with reference to step S9 and then records it in the power recording part 10.

In other words, the characteristic value $\beta$ is calculated based on equation (6) using the peak value P and the bottom value B of the envelope obtained from $P_{01}$ to $P_{05}$. Then, the writing laser power value P for $\beta=0.04$ is derived by proportional distribution and recorded in the power value recording part 10.

In step S17, the control part 13 records data in the optical disk indicating that the partitions up to (n+2) of the test area have already been used. Then, the process proceeds to step S19 where the writing laser power value P recorded in the power value recording part 10 is read out and output to the error amplifier, and the recording operation of the information is initiated.

Figure 5:
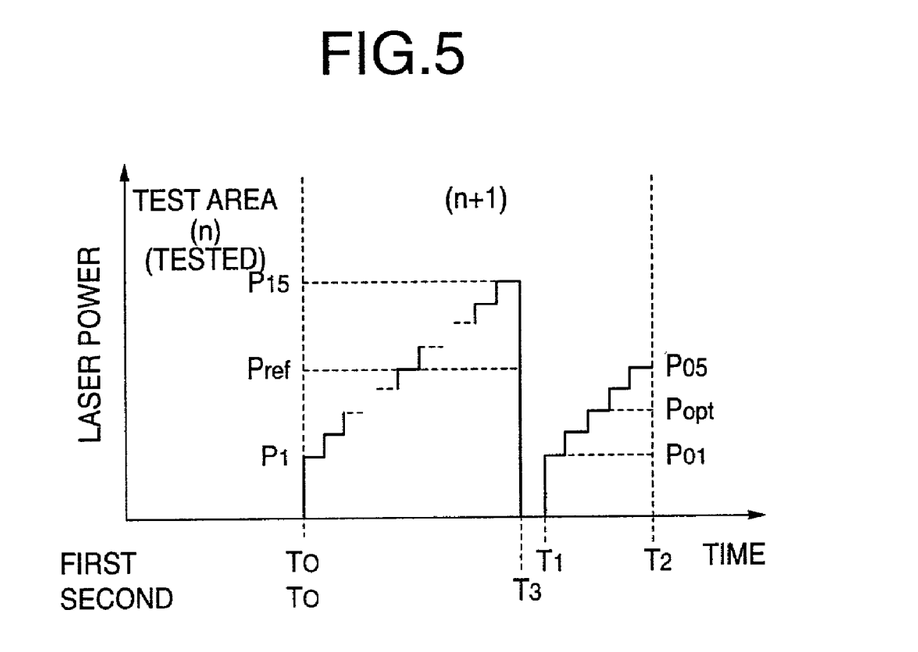
FIG. 5 is a graph of laser power against time of another embodiment used for explaining how a writing operation is carried out on a test area.

In the present embodiment, as shown in FIG. 4, the first and second writing operation are carried out using the partitions (n+1) and (n+2), respectively. However, as shown in FIG. 5, the first writing operation may be carried out using the first half ($T_0$ to $T_3$) of the unused partition (n+1) and the second writing operation may be carried out using the second half ($T_1$ to $T_2$) of the unused partition (n+1).

It is also possible to perform the first writing operation using the second half ($T_1$ to $T_2$) of the unused partition (n+1) and the second writing operation using the first half ($T_0$ to $T_3$) of the unused partition (n+1).

Figure 6:
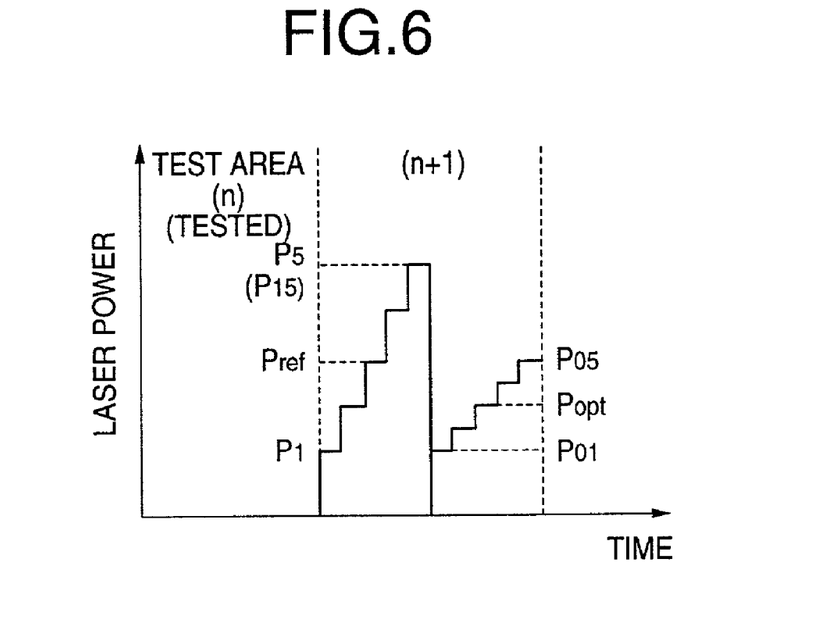
FIG. 6 is a graph of laser power against time of another embodiment used for explaining how a writing operation is carried out on a test area.

In the present invention, the first writing is carried out using 15 steps, but the writing operation may be carried out using a number of steps less than 15 steps as shown in FIG. 6.

Thus, by implementing the writing operation using a number of steps less than 15 steps, the length of time allotted to each step becomes longer. Thus, an accuracy of writing can be improved.

Further, the present invention is not limited to these embodiments, and variations and modifications may be made without departing from the scope of the present invention.

The present application is based on Japanese priority applications No. 2000-392356 filed on Dec. 25, 2000 and No. 2001-122611 filed on Apr. 20, 2001, the entire contents of which are hereby incorporated by reference.

What is claimed is:

1. An optical disk device for writing information on an optical disk, said optical disk device having an APC (Automatic Power Control) part for monitored driving of a laser diode, said optical disk device comprising:

preparation means for searching an unused partition of a test area of said optical disk and reading out a reference power value from said optical disk;

APC-turn off means for turning off said APC part so that the APC part stops monitored driving of the laser diode when it is determined that the recording speed exceeds a predetermined speed;

first OPC (Optimum Power Control) means for obtaining a first optimum writing power value by writing on said unused partition by driving said laser diode at a plurality of first test laser power values centered on said reference power value, reading out said information recorded on said unused partition and determining the first optimum writing power value;

APC-turn on means for turning on said APC part so that the APC part resumes monitored driving of the laser diode after determining the first optimum writing power value when it is determined that said APC part has been turned off by said APC-turn off means; and second OPC (Optimum Power Control) means for obtaining a second optimum writing power value by writing on a subsequent unused partition by driving said laser diode at a plurality of second test laser power values centered on said first optimum writing power value, reading out said information recorded on said subsequent unused partition and determining the second optimum writing power value.

2. The optical disk device as claimed in claim 1, wherein a number of said second test laser power values are less than a number of said first test laser power values.

3. The optical disk device as claimed in claim 1, wherein an interval of said second test laser power values is smaller than an interval of said first test laser power values.

4. The optical disk device as claimed in claim 1, wherein said first optimum writing power is derived using a first half of said unused partition of said test area and said second optimum writing power is derived using a second half of said unused partition of said test area.

5. The optical disk device as claimed in claim 1, wherein said first optimum writing power is derived using a second half of said unused partition of said test area and said second optimum writing power is derived using a first half of said unused partition of said test area.

6. The optical disk device as claimed in claim 1, wherein a writing operation is performed on the most recently used partition of the test area at a predetermined power value and then a writing operation is performed on said unused partition at said plurality of first test laser power values.

7. The optical disk device as claimed in claim 6, wherein said writing operation on said unused partition at said plurality of first test laser power values is performed after said optical disk has rotated through one or more revolutions.

8. The optical disk device as claimed in claim 1, wherein when the recording speed does not exceed a predetermined value, said first optimum writing power value is used as a writing power value.

9. A meted of writing information on an optical disk comprising the steps of:

a) searching an unused partition of a test area of said optical disk and reading out a reference power value from said optical disk;

b) turning off an APC (Automatic Power Control) part so that the APC part stops monitored driving of the laser diode when it is determined that the recording speed exceeds a predetermined speed (1×);

c) obtaining a first optimum writing power value by writing on said unused partition by driving said laser diode at a plurality of first test laser power values centered on said reference power value, reading out said information recorded on said unused partition and determining the first optimum writing power value;

d) turning on said APC part so that the APC part resumes monitored driving of the laser diode after determining the first optimum writing power value when it is determined that said APC part has been turned off in step b); and e) obtaining a second optimum writing power value by writing on a subsequent unused partition by driving said laser diode at a plurality of second test laser power values centered on said first optimum writing power value, reading out said information recorded on said subsequent unused partition and determining the second optimum writing power value.

* * * * *